P. O. TVEDEN.
PULLEY.
APPLICATION FILED MAY 13, 1918.
1,309,921. Patented July 15, 1919.
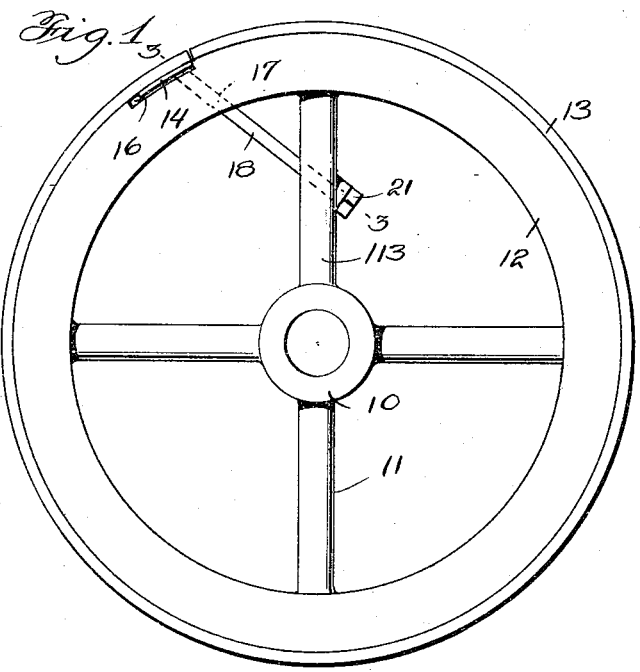
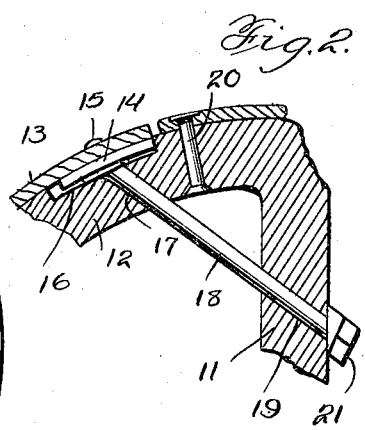
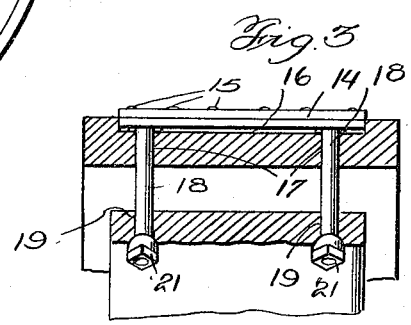
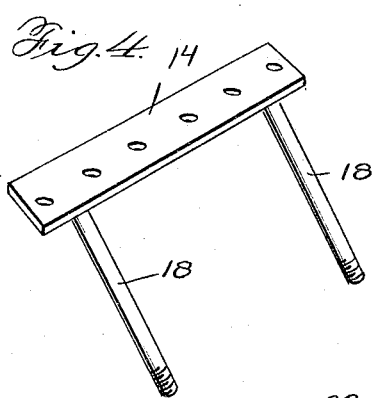
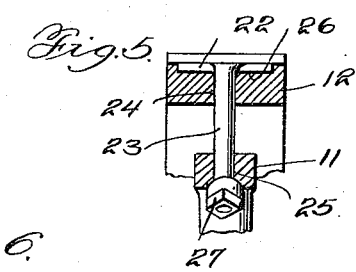
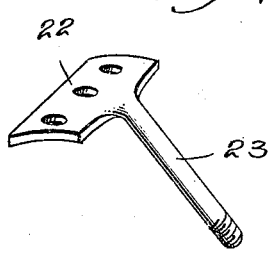
Inventor
P. O. Tveden

UNITED STATES PATENT OFFICE.

PEDER O. TVEDEN, OF WATFORD CITY, NORTH DAKOTA.

PULLEY.

1,309,921.  Specification of Letters Patent.  Patented July 15, 1919.

Application filed May 13, 1918. Serial No. 234,194.

*To all whom it may concern:*

Be it known that I, PEDER O. TVEDEN, a citizen of the United States, residing at Watford City, in the county of McKenzie, State of North Dakota, have invented certain new and useful Improvements in Pulleys; and I do hereby declare the following to be a full, clear, and exact description of the invention, such as will enable others skilled in the art to which it appertains to make and use the same.

This invention is an improvement in pulleys and has particular reference to a rim cover therefor.

An object of the invention is to facilitate the application of a rim cover or "lagging" about a periphery of a pulley by the provision of improved means whereby the cover is tightened about the pulley and maintained in such condition while fastening the same thereto thus avoiding the laborious method of stretching and holding the cover each time a fastener is driven therethrough and into the pulley.

Another object is the provision of a pulley of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing wherein:—

Figure 1 is a side elevation of a pulley constructed in accordance with the invention.

Fig. 2 is an enlarged fragmentary vertical longitudinal section therethrough.

Fig. 3 is a section on the line 3—3 of Fig. 1.

Fig. 4 is a perspective view of the tightening device employed in connection with the pulley.

Fig. 5 is an enlarged framentary section similar to that of Fig. 2 showing a slightly different form of the invention.

Fig. 6 is a perspective view of the tightening device employed in Fig. 5.

Referring more particularly to the drawing in which like references indicate similar parts, the numeral 10 indicates the hub of a pulley and 11 the spokes radiating therefrom and having the usual rim 12 at the outer ends thereof.

In order to provide a friction surface for the periphery of the pulley whereby the slipping of belts thereabout will be prevented the same is provided with a rim cover or "lagging" 13 made of leather or any other suitable material and in the ordinary method of securing this rim cover to the pulley one end of the strip of leather is secured to the pulley and from the point of fastening the cover or "lagging" is stretched and suitable fasteners are then driven through the same and into the rim of the pulley a short distance from the end thereof which was initially fastened to the pulley. The cover is then again stretched and other fasteners secured in position and this operation is continued until the entire length of the cover has been secured to the pulley by the insertion of fasteners arranged at slight intervals apart. This method of securing the rim cover or "lagging" to the pulley has been found objectionable in that it usually requires the work of two persons to stretch the cover and drive the fasteners into position and furthermore considerable time is occupied in taking the successive steps of first stretching or tightening a short length of the cover about the pulley and then holding the same until the fasteners are driven in place.

It is for the purpose of overcoming the above objections and thereby saving both time and labor that the present invention is designed and, to this end, use is preferably made of a tightening device secured to one end of the cover or "lagging" and also to the pulley and manipulated in such manner that the cover will be tightened or stretched about the rim of the pulley simultaneously throughout its entire length and held in its tightened or stretched position so that the fasteners may be driven in place. This fastening device preferably comprises a plate or bar 14 which, as shown in Figs. 1 to 4 inclusive, which is secured transversely of one end of the cover 13 by means of rivets or other fasteners 15 and this plate is disposed upon the inner surface of the cover and is arranged transversely within a recess 16 formed in the periphery of the pulley so that when the plate is in position the same will be countersunk within said recess thus enabling the cover to present a smooth exterior surface. The length of the plate 14 is substantially the same as the width of the rim 12 and cover 13 therefor and the width of said plate is less than the length of the recess 16 so as to permit of a slight circumferential movement of the plate or bar 14 when the cover 13 is being tightened about the rim. Extending diagonally through the rim 12 and having their outer ends communicating with the bottom of the recess 16 are the bolt receiving openings 17 through which the inner ends of bolts 18 extend. These bolts are formed integrally with the plate 14 adjacent the ends thereof and are of sufficient length to extend through openings 19 formed in an adjacent spoke 11 and arranged transversely and diagonally with respect to the longitudinal axis thereof.

In applying the cover or "lagging" to the rim of the pulley one end of the cover is secured to the rim as indicated at 20 adjacent the recess 16 and the cover is then extended about the rim and the fastening device carried by the other end of the cover is inserted into its position within the recess 16 and the openings 17 and 19. A nut 21 is then threaded upon the free end of each bolt and engaged with the spoke 11 through which the bolt extends. It will be apparent that, by reason of the diagonal arrangement of the bolt with respect to the plate 14, a pull will be exerted upon the bolt to draw the cover about the rim of the pulley and tighten or stretch the same into its proper position after which the operator may drive fasteners, similar to the fasteners 20 through the cover and rim at suitable intervals whereby the cover will be secured in position.

In the form of the invention shown in Figs. 5 and 6, the fastening device is designed for use on pulleys of considerably narrower width than the pulley shown in the other figures and, in this instance, the fastening device consists of a plate 22 secured to one end of the cover 13 in the same manner that the plate 14 is fastened thereto and the plate 22 has extending therefrom only one bolt 23 which is disposed in openings 24 and 25 in the rim and an adjacent spoke, respectively, said openings being disposed similarly to the openings 17 and 19, the outer end of the opening 24 in the rim also communicating with a recess 26 therein in which the plate 22 is countersunk. A nut 27 threaded upon the bolt 23 and engaged with the adjacent spoke will also operate to tighten the cover about the rim previous to fastening the same thereto.

What is claimed is:—

1. The combination with a pulley including a rim and spoke having alined openings the rim also having a recess communicating with the opening therein; of a cover for the rim engageable about the periphery thereof and having one end secured thereto, and a tightening device secured to the other end of said cover and including a plate countersunk in said recess, and a bolt extending from said plate and through the openings in said rim and spoke whereby said cover may be tightened about the rim.

2. The combination with a pulley including a rim and a spoke and having openings arranged diagonally with respect thereto, the rim also having a peripheral recess communicating with the opening therein; of a flexible cover for the rim having one end secured thereto adjacent said recess, a tightening device secured to the other end of said cover and including a plate arranged upon the inner surface of the cover and disposed in said recess and adapted for circumferential movement therein, a bolt extending diagonally from said plate and through the openings in said rim and spoke, and a nut threaded on the bolt and engageable with said spoke to draw upon said bolt whereby a pull will be exerted upon the free end of said cover to tighten the same about said rim.

In testimony whereof I affix my signature in the presence of two witnesses.

PEDER O. TVEDEN.

Witnesses:
J. C. NELSON,
H. M. WOOD.

Copies of this patent may be obtained for five cents each, by addressing the "Commissioner of Patents, Washington, D. C."